(12) United States Patent
Zheng et al.

(10) Patent No.: US 8,121,493 B2
(45) Date of Patent: Feb. 21, 2012

(54) DISTORTION COMPENSATION CIRCUIT AND METHOD BASED ON ORDERS OF TIME DEPENDENT SERIES OF DISTORTION SIGNAL

(75) Inventors: Jun Zheng, Houston, TX (US); Brian Ishaug, Sugar Land, TX (US)

(73) Assignee: Applied Optoelectronics, Inc., Sugar Land, TX (US)

( * ) Notice: Subject to any disclaimer, the term of this patent is extended or adjusted under 35 U.S.C. 154(b) by 998 days.

(21) Appl. No.: 12/025,883

(22) Filed: Feb. 5, 2008

(65) Prior Publication Data

US 2009/0196629 A1 Aug. 6, 2009

(51) Int. Cl.
*H04B 10/04* (2006.01)
*H04B 10/12* (2006.01)

(52) U.S. Cl. .................................. 398/194; 398/193
(58) Field of Classification Search ............ 398/192–194
See application file for complete search history.

(56) References Cited

U.S. PATENT DOCUMENTS

| | | | |
|---|---|---|---|
| 4,068,186 A | 1/1978 | Sato et al. | |
| 4,992,754 A | 2/1991 | Blauvelt et al. | |
| 5,132,639 A | 7/1992 | Blauvelt et al. | |
| 5,252,930 A | 10/1993 | Blauvelt | |
| 5,321,710 A | 6/1994 | Cornish et al. | |
| 5,361,156 A | 11/1994 | Pidgeon | |
| 5,418,637 A | 5/1995 | Kuo | |
| 5,424,680 A * | 6/1995 | Nazarathy et al. | 330/149 |
| 5,436,749 A * | 7/1995 | Pidgeon et al. | 398/193 |
| 5,481,389 A * | 1/1996 | Pidgeon et al. | 398/208 |
| 5,600,472 A | 2/1997 | Uesaka | |
| 5,703,530 A | 12/1997 | Sato et al. | |
| 6,055,278 A * | 4/2000 | Ho et al. | 375/296 |
| 6,061,161 A | 5/2000 | Yang et al. | |
| 6,122,085 A | 9/2000 | Bitler | |
| 6,133,790 A | 10/2000 | Zhou | |
| 6,388,518 B1 | 5/2002 | Miyatani | |
| 6,741,128 B2 | 5/2004 | Okubo et al. | |
| 6,757,525 B1 | 6/2004 | Ishikawa et al. | |
| 6,759,897 B2 | 7/2004 | Ciemniak | |
| 6,917,764 B1 * | 7/2005 | Wilson | 398/193 |
| 6,919,765 B2 | 7/2005 | Zappala | |
| 6,943,628 B2 | 9/2005 | Weldon | |

(Continued)

OTHER PUBLICATIONS

Applied Optoelectronics, Inc., "DFB-1310-P3-xx-A3-xx Laser Module", Applied Optoelectronics, Inc. 2006, pp. 1-6.

(Continued)

*Primary Examiner* — Nathan Curs
(74) *Attorney, Agent, or Firm* — Grossman Tucker Perreault & Pfleger, PLLC; Norman S. Kinsella (57) ABSTRACT

A distortion compensation circuit compensates for distortion generated by one or more non-linear elements such as a laser device. The distortion compensation circuit may be used in an optical transmitter, such as a laser transmitter used for forward path CATV applications. The distortion compensation circuit may include a primary signal path and a secondary signal path that receive an input signal. The secondary signal path produces distortion of a magnitude corresponding to the magnitude of, but at an opposite phase to, the distortion generated by the non-linear amplifier. The secondary signal path includes a plurality of distortion sub-paths with each of the distortion sub-paths configured to produce intermodulation distortion products of the same distortion order but for different frequency dependent orders in a time dependent series representative of the distortion produced by the non-linear amplifier.

25 Claims, 6 Drawing Sheets

U.S. PATENT DOCUMENTS

| | | | |
|---|---|---|---|
| 7,466,925 B2 | 12/2008 | Ianelli | |
| 7,925,170 B2 | 4/2011 | Ishaug | |
| 2001/0054927 A1 | 12/2001 | Zhou et al. | |
| 2009/0196630 A1 | 8/2009 | Ishaug | |

OTHER PUBLICATIONS

Applied Optoelectronics, Inc., "DFB-1310-P2-xx-A3-xx Predistorted Laser Transmitter", Applied Optoelectronics, Inc. 2005, pp. 1-5.

Applied Optoelectronics, Inc., "DFB-1xxx-P3-xx-A3-xx Laser Module", Applied Optoelectronics, Inc. 2006, pp. 1-8.

International Search Report and Written Opinion dated Mar. 30, 2009 issued in related International Patent Application No. PCT/US2009/033175.

Linear Technology, "LT5534—50 MHz to 3GHz RF Power Detector with 60dB Dynamic Range," available at http://cds.linear.com/docs/Datasheet/5534fc.pdf, retrieved on Jul. 27, 2011.

Cisco, "Prisma II 1 GHz SuperQAM Transmitter," available at www.cisco.com/en/US/prod/collateral/video/ps8806/.../7019211b.pdf, retrieved on Jul. 27, 2011.

Scientific Atlanta, "Optoelectronics Prisma II 1 GHz 1550 nm Transmiters," available at http://tulsat.com/productImages/DownloadFiles/1GHz_1550.pdf; retrieved on Jul. 27, 2011.

Office Action dated Mar. 8, 2010 U.S. Appl. No. 11/834,873.

Notice of Allowance dated Dec. 8, 2010 U.S. Appl. No. 11/834,873.

Office Action dated Mar. 1, 2011 U.S. Appl. No. 12/026,182.

* cited by examiner

DISTORTION COMPENSATION CIRCUIT AND METHOD BASED ON ORDERS OF TIME DEPENDENT SERIES OF DISTORTION SIGNAL

TECHNICAL FIELD

The present invention relates to distortion compensation and more particularly, to a distortion compensation circuit and method based on orders of time dependent series of distortion signal.

BACKGROUND INFORMATION

A directly modulated laser may be used as an optical transmitter that transmits light at a given wavelength. The power (i.e., amplitude) of the laser light is modulated by corresponding modulation of the current used to drive the laser. For example, the optical transmitter may be modulated to carry a wide-band RF signal. In this case, the electrical current that drives or pumps the laser is modulated with the wide-band RF signal.

The use of a directly-modulated laser to carry a wide-band RF signal may result in distortion due to the multiple carrier frequencies of the multichannel RF signal modulating the laser and/or the harmonics produced by the non-linear nature of the laser device. Intermodulation distortion may be produced when two or more signals mix together to form distortion products. Discrete distortion may be produced from only one carrier. Distortion may include even-order distortion and odd-order distortion. In a CATV system, the most significant types of even-order and odd-order distortion products are second-order distortion products and third-order distortion products, respectively. Second-order intermodulation ($IM_2$) distortion products may include, for example, intermodulation products formed by combining signals at frequencies A and B, such as A±B. In a CATV system, the sum of second-order intermodulation products that are present in a particular channel is commonly referred to as composite second order (CSO) distortion. Third-order intermodulation ($IM_3$) distortion products may include, for example, intermodulation products formed by combining signals at frequencies A, B, and C, such as A±B±C, 2A±B. In a CATV system, the sum of third-order intermodulation products that are present in a particular channel is commonly referred to as composite triple beat (CTB) distortion.

The non-linearities of a time independent non-linear element, such as an amplifier, may be modeled as Taylor series expansions or power series expansions of an input signal. For example, the output y of a non-linear amplifier may be described as a Taylor series expansion of an input x:

$$y(x) = C_0 + C_1 x + C_2 x^2 + C_3 x^3 + C_4 x^4 + \ldots C_k x^k \qquad \text{Eq. 1}$$

where $C_0, C_1, C_2, C_3, C_4, \ldots C_k$ are constants representative of the behavior of the non-linear amplifier. The order within the series is determined by the highest power of x in the expansion. The even order ($x^{2n}$, where n=1, 2, 3 ...) terms in the series (e.g., $C_2 x^2, C_2 x^4, C_2 x^6, \ldots$) represent even order distortion and the odd order ($x^{2n+1}$ where n=1, 2, 3 ...) terms in the series (e.g., $C_2 x^3, C_2 x^5, C_2 x^7, \ldots$) represent odd order distortion. For example, $C_2 x^2$ is the second-order term and represents distortion from the first of the even order terms and $C_3 x^3$ is the third-order term and represents distortion from the first of the odd order terms. When the input x is an RF input, both x and y are time-varying quantities. With an input having two angular frequencies ($\omega_1$ and $\omega_2$) represented as x=a sin($\omega_1$t)+b sin($\omega_2$t), the second order term $C_2 x^2$ creates second order distortion products at frequencies $2\omega_1, 2\omega_2, \omega_1-\omega_2$, and $\omega_1+\omega_2$. Because the non-linear element in this case is time independent, the magnitude and phase of these distortion products are not dependent upon the modulation frequency. However, some non-linear elements, such as lasers, have time dependence and thus have distortion characteristics dependent on the frequency of the modulating signal.

Several techniques have been proposed or employed to compensate for distortion by injecting distortion of equal magnitude but opposite phase to the distortion produced by the laser device. For example, a predistortion circuit may be employed to predistort the RF signal being applied to modulate the laser. One such predistortion circuit includes split signal paths—a main or primary signal path and a secondary signal path. A small sample of the RF input is tapped off the main signal path and a distortion generator in the secondary signal path generates distortion (i.e., predistortion). The predistortion is then recombined with the RF signal on the main signal path such that the predistortion is of equal magnitude but opposite sign to the laser-induced distortion.

These predistortion circuits have been proposed or employed using frequency independent magnitude adjustments in the secondary path and even magnitude-phase tilt filters to account for the frequency dependent effects in non-linear elements that have time dependence. However, such existing predistortion circuits may not adequately compensate for the frequency-dependent distortion. Further, other non-linear elements may also contribute to distortion. In an optical system, for example, non-linear elements may include at least the laser, optical fiber and amplifier non-linearities.

BRIEF DESCRIPTION OF THE DRAWINGS

These and other features and advantages will be better understood by reading the following detailed description, taken together with the drawings wherein.

DETAILED DESCRIPTION

A distortion compensation circuit, consistent with embodiments of the present invention, may be used with one or more non-linear elements, such as a laser, to compensate for distortion generated by the non-linear element(s), for example, in broadband applications. As will be described in greater detail below, embodiments of the distortion compensation circuit may include a plurality of distortion paths corresponding to different frequency dependent orders of a time dependent series of a distortion signal. The distortion compensation circuit may include, for example, a frequency independent distortion path and one or more frequency dependent distortion paths to produce distortion that compensates for frequency dependent distortion generated by the non-linear element(s).

Distortion compensation circuits may include predistortion circuits, which generate compensating distortion before the non-linear element(s), for example, in an optical transmitter. Distortion compensation circuits may also include postdistortion circuits, which generate compensating distortion after the non-linear element(s), for example, in an optical receiver. Although some of the exemplary embodiments may refer specifically to predistortion circuits, the concepts described herein may be used with predistortion compensation, postdistortion compensation, or a combination thereof. Thus, distortion compensation circuits, consistent with the embodiments described herein, may be used to compensate for distortion produced by one or more non-linear elements before and/or after the distortion compensation circuits.

Figure 1:
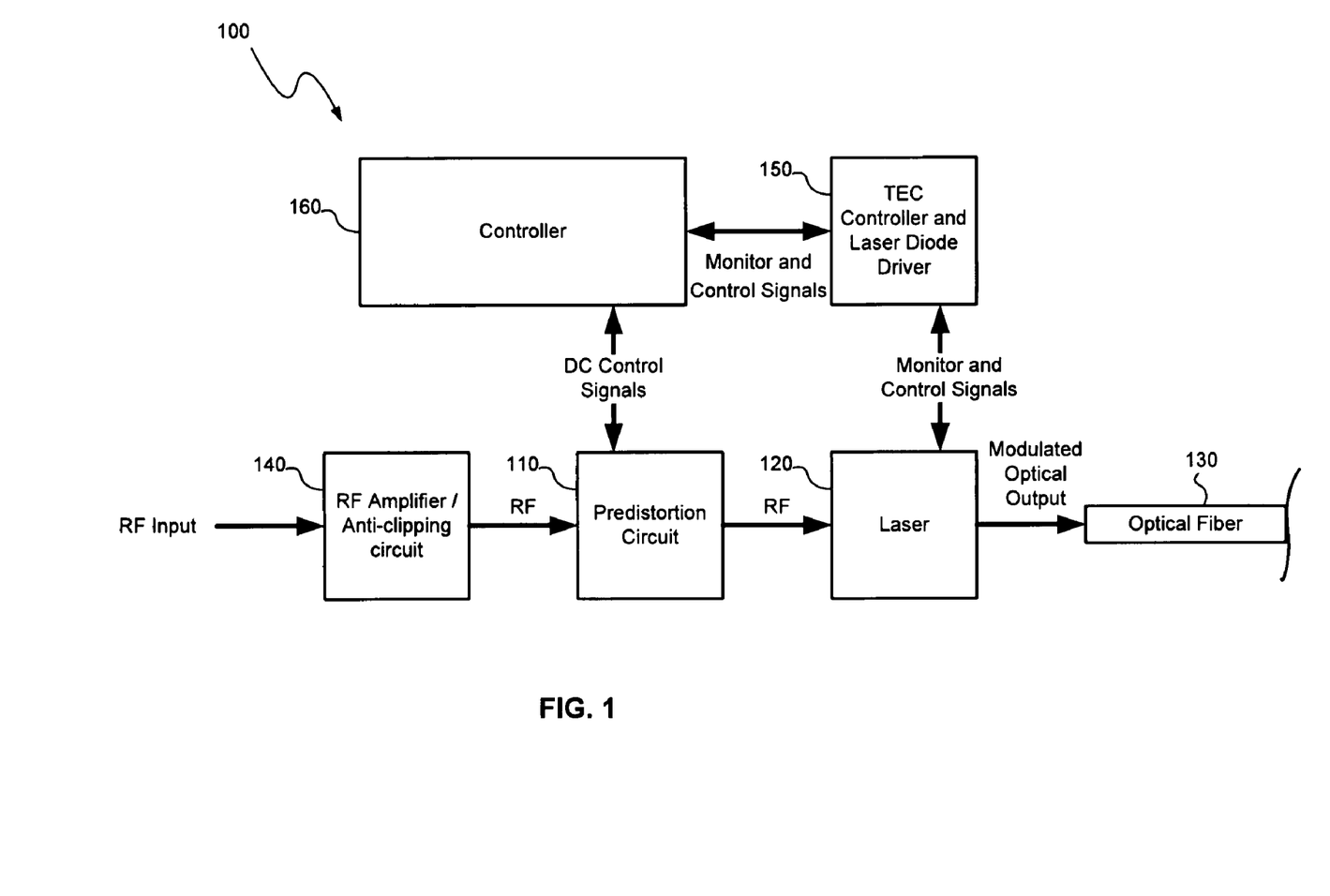
FIG. 1 is a schematic diagram of an optical transmitter including a predistortion circuit, consistent with one embodiment of the invention.

Referring to FIG. 1, an optical transmitter 100 may include a predistortion circuit 110 to generate predistortion that compensates for distortion produced by one or more non-linear elements, such as a laser 120 and/or an optical fiber 130 when a RF signal modulates the laser 120 to produce a modulated optical output coupled into the optical fiber 130. As used herein, "compensate" or "compensating" for distortion means reducing distortion to a point that is tolerable in a particular system and does not necessarily require elimination of distortion. To compensate for distortion produced by the laser 120, the predistortion may be generated by the predistortion circuit 110 with a magnitude substantially equal to the magnitude of the distortion produced by the laser 120 and/or optical fiber 130 and a phase that is substantially opposite the phase of the distortion produced by the laser 120, optical fiber 130 and/or non-linear elements such as amplifier non-linearities.

According to one embodiment, the optical transmitter 100 may also include RF amplifier/anti-clipping circuit 140 to receive and amplify the RF input signal (e.g., a multi-channel carrier multiplex signal) and/or to modify the RF input signal to prevent or reduce clipping in the laser 120. One example of an anti-clipping circuit is the type described in greater detail in commonly-owned U.S. patent application Ser. No. 11/753, 082, which is incorporated herein by reference. The predistortion circuit 110 may then receive the amplified RF signal, generate the predistortion and combine the predistortion with the RF signal that modulates the laser 120. The laser 120 may be a directly-modulated electrically pumped semiconductor laser, such as a laser diode.

One embodiment of the optical transmitter 100 may further include thermo-electric cooler (TEC) controller and laser diode driver circuitry 150 to control the temperature of and to bias the laser 120. A controller 160, such as a microprocessor, may be used to control the components and the operation of the optical transmitter 100. The TEC controller and laser diode driver circuitry 150 and the microcontroller 160 may include components known to those skilled in the art for use in a laser transmitter, such as the type available from Applied Optoelectronics, Inc.

One example of an optical transmitter 100 is a laser transmitter designed for forward-path CATV applications. In such "broadband" applications, the optical transmitter 100 and particularly the laser 120 may be designed for high frequency operation, for example, up to about 1 GHz. The distortion compensation circuits and methods described herein may also be used in other applications (e.g., using different or even higher frequencies) and/or with other types of optical transmitters. Embodiments of the distortion compensation circuit may also be used with any non-linear element or device that generates distortion that can be compensated with predistortion or postdistortion.

Distortion compensation circuits, such as predistortion circuit 110, may generate distortion (e.g., predistortion or postdistortion) based on different frequency dependent orders of a time dependent series representative of a distortion signal. As mentioned above, the output y of a non-linear element may be described as a Taylor series expansion of an input x:

$$y(x) = C_0 + C_1 x + C_2 x^2 + C_3 x^3 + C_4 x^4 + \ldots C_k x^k \qquad \text{Eq. 2}$$

where $C_0, C_1, C_2, C_3, C_4, \ldots C_k$ are constants representative of the behavior of the non-linear amplifier. The order within this series is determined by the highest power of x in the expansion. For example, $C_2 x^2$ is the second-order term. When the non-linear element also has time dependence, such as for lasers, the Taylor series may be further expanded as a time dependent series including time dependent terms as follows:

$$y(x(t)) = C_{00} + C_{01} x + C_{02} x^2 + C_{03} x^3 + \ldots C_{0k} x^k + \qquad \text{Eq. 3}$$
$$C_{11} \frac{dx}{dt} + C_{12} x \frac{dx}{dt} + C_{13} x^2 \frac{dx}{dt} + \ldots C_{1k} x^{k-1} \frac{dx}{dt} +$$
$$C_{21} \frac{d^2 x}{dt^2} + C_{22} x \frac{d^2 x}{dt^2} + C_{23} x^2 \frac{d^2 x}{dt^2} + \ldots C_{2k} x^{k-1} \frac{d^2 x}{dt^2} +$$
$$\vdots$$
$$C_{n1} \frac{d^n x}{dt^n} + C_{n2} x \frac{d^n x}{dt^n} + \ldots C_{nk} x^{k-1} \frac{d^n x}{dt^n}$$

When an input having two angular frequencies ($\omega_1$ and $\omega_2$) represented as $x = a \sin(\omega_1 t) + b \sin(\omega_2 t)$ is applied to the above time dependent non-linear element, the second order distortion at frequencies $2\omega_1, 2\omega_2, \omega_1 - \omega_2,$ and $\omega_1 + \omega_2$ will have an amplitude and phase that is dependent on frequency. For the $2\omega_1$ term, the dependence may be represented as follows:

$$y_{2\omega_1} = \qquad \text{Eq. 4}$$
$$\frac{a^2}{2} [C_{02} \cos(2\omega_1 t) + C_{12} \omega_1 \sin(2\omega_1 t) - C_{22} \omega_1^2 \cos(2\omega_1 t) + \ldots]$$

The first term in the above series represents the frequency independent term. The remaining terms represent frequency dependent terms that are a result of the time dependence upon distortion. A similar dependence can be found for other second order distortion products.

When the non-linear element is a laser being modulated by an input current to produce light output, the input is current I(t) and the output is laser output power P(I(t)). The power signal P may thus be represented by the following time dependent series:

$$P = P(I(t)) = C_{00} + C_{01}I(t) + C_{02}I(t)^2 + \ldots C_{0k}I(t)^k +$$ Eq. 5
$$C_{11}\frac{dI}{dt} + C_{12}I\frac{dI}{dt} + \ldots C_{1k}I^{k-1}\frac{dI}{dt} +$$
$$C_{21}\frac{d^2I}{dt^2} + C_{22}I\frac{d^2I}{dt^2} + \ldots C_{2k}I^{k-1}\frac{d^2I}{dt^2} +$$
$$\vdots$$
$$C_{n1}\frac{d^nI}{dt^n} + C_{n2}I\frac{d^nI}{dt^n} + \ldots C_{nk}I^{k-1}\frac{d^nI}{dt^n}$$

In Equation 4, k indicates the order of the series representing distortion (i.e., distortion order) and n indicates the order of the time dependent series (i.e., frequency dependent order). For example, the term $C_{02}I(t)^2$ represents second order distortion and zero order of the time dependent series of the second order distortion.

For a laser that is being modulated by an input current to produce a light output, the input current for a single angular frequency $\omega$ may be represented as follows:

$$I(t) = I_0 + I_1 e^{i\omega t}$$ Eq. 6

Using Equation 5 in the expanded series of Equation 4, the second order distortion terms of the expanded time dependent series of the power signal P may be represented as follows:

$$P_2 = C_{02}I_1^2 e^{i2\omega t} +$$ Eq. 7
$$C_{12}I_1^2 e^{i2\omega t} i\omega +$$
$$C_{22}I_1^2 e^{i2\omega t}(i\omega)^2 +$$
$$C_{32}I_1^2 e^{i2\omega t}(i\omega)^3 +$$
$$\vdots +$$
$$C_{n2}I_1^2 e^{i2\omega t}(i\omega)^n$$

In this time dependent series representing the power signal second order distortion $P_2$ (e.g., CSO distortion), the zero (0) order term $C_{02}I_1^{2}e^{i2\omega t}$ is frequency independent and the higher order (2 . . . n) terms $C_{12}I_1^2 e^{i2\omega t}i\omega$, $C_{22}I_1^2 e^{i2\omega t}(i\omega)^2$, $C_{32}I_1^2 e^{i2\omega t}(i\omega)^3$, . . . $C_{n2}I_1^2 e^{i2\omega t}(i\omega)^n$ are frequency dependent. A similar time dependent series may be used to represent third order distortion (e.g., CTB distortion). Thus, the different distortion orders within the power signal, such as second order distortion (e.g., CSO) and third order distortion (e.g., CTB), may each be represented as a time dependent series having terms with different frequency dependent orders within the time dependent series. The second order intermodulation distortion (i.e., CSO distortion) may be represented more simply as a function of angular frequency ($\omega$) with three (3) frequency dependent orders as follows:

$$IMD2(\omega) = a + b(i\omega) + c(i\omega)^2$$ Eq. 8 where a represents the 0 order CSO term, which is frequency independent, $b(i\omega)$ represents the first order CSO term, which is linear with frequency (i.e., $\pi/2$), and $c(i\omega)^2$ represents the second order CSO term, which is linear to the second order (i.e., $\pi$).

Distortion compensation circuits may thus compensate for multiple distortion terms in the time dependent series representing a distortion signal to improve distortion compensation. In general, the distortion compensation circuit may include multiple distortion generator units corresponding to multiple distortion terms in the time dependent series to independently generate distortion products for those different terms. Various embodiments of such distortion compensation circuits capable of being used with a laser in an optical transmitter are described in greater detail below. Although the exemplary embodiment refers to compensation of distortion generated by a laser in an optical transmitter, the distortion compensation circuits described herein may be used in any type of RF system to compensate for distortion generated by any type of non-linear element. For any such RF system, the distortion profile of the non-linear element may be determined by expanding the non-linear output as a time dependent series, as discussed above. An appropriate number of distortion generator units may be used for different terms in the time dependent series to closely achieve that distortion profile and provide a more linear output from the non-linear element.

Figure 2:
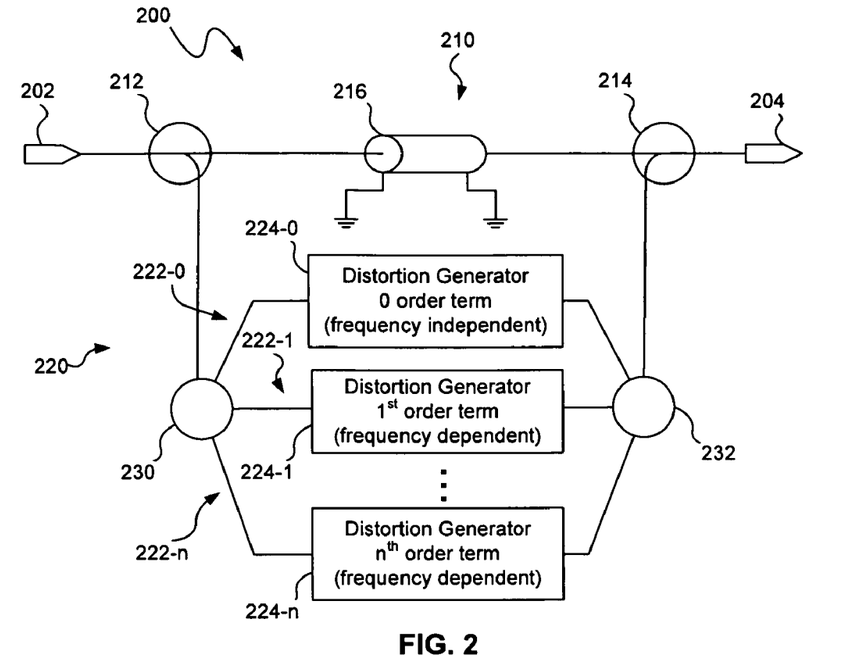
FIG. 2 is a schematic diagram of a distortion compensation circuit including multiple paths based on orders of time dependent series of a distortion signal, consistent with one embodiment of the invention.

Referring to FIG. 2, a predistortion circuit 200, consistent with an embodiment of the present invention, is described in greater detail. The predistortion circuit 200 receives a RF input signal at a signal input 202, generates the predistortion to predistort the RF input signal, and provides a predistorted RF signal at a predistorted signal output 204. The predistortion circuit 200 may include a primary signal path 210 and a secondary signal path 220 that are coupled together, for example, using directional couplers such as a directional splitter 212 and a directional combiner 214. At the directional splitter 212, at least a portion of the RF input signal is received on the primary and secondary signal paths 210, 220, respectively.

The secondary signal path 220 produces intermodulation distortion products from the RF input signal received on the secondary signal path 220 and generates those intermodulation distortion products based on the orders of the time dependent series of the distortion described above. At the directional combiner 214, intermodulation distortion products produced on the secondary signal path 220 are combined with the RF input signal on the primary signal path 210 with a desired magnitude and phase to produce the predistorted RF signal that compensates for distortion generated by the laser and/or other non-linear element (not shown in FIG. 2). The primary signal path 210 may include a delay element 216, such as a transmission line of a selected length, which delays the RF input signal on the primary signal path 210 to correspond to the delay caused by generating the predistortion on the secondary signal path 220. Such a delay helps to ensure that the predistortion on the secondary signal path 220 remains in phase with the RF input signal on the primary signal path 210.

According to one embodiment, the secondary signal path 220 may include parallel distortion sub-paths 222-0, 222-1, . . . 222-n coupled at one end to splitter 230 and coupled at the other end to a combiner 232. The distortion sub-paths 222-0, 222-1, . . . 222-n correspond to the distortion terms having different frequency dependent orders in the time dependent series representing the distortion. For CSO compensation, for example, the sub-paths 222-0, 222-1, . . . 222-n correspond to the 0 order, $1^{st}$ order to $n^{th}$ order terms $C_{02}I_1^2 e^{i2\omega t}$, $C_{12}I_1^2 e^{i2\omega t}i\omega$, . . . $C_{n2}I_1^2 e^{i2\omega t}(i\omega)^n$, respectively, in the time dependent series representing second order intermodulation distortion. The distortion sub-path 222-0 corresponding to the 0 order term is frequency independent and the distortion sub-path(s) 222-1 . . . 222-n corresponding to the $1^{st}$ and higher order terms are frequency dependent.

The parallel distortion sub-paths 222-0, 222-1, . . . 222-n may include distortion generators 224-0, 224-1, . . . 224-n that produce intermodulation distortion products corresponding to the distortion terms with the different respective orders of the time dependent series. For a predistortion circuit 200 that compensates for CSO distortion, for example, each of the distortion generators 224-0, 224-1, . . . 224-n generate second order intermodulation distortion products corresponding to the respective CSO terms in the time dependent series representing CSO distortion. For example, the distortion generator 224-0 generates second order intermodulation distortion products corresponding to the zero order frequency dependent term $C_{02}I_1^2 e^{j2\omega t}$ and the distortion generator 224-1 generates second order intermodulation distortion products corresponding to the first order frequency dependent term $C_{12}I_1^2 e^{j2\omega t}i\omega$. If the predistortion circuit 200 is designed to compensate for CTB distortion, the distortion generators 224-0, 224-1, . . . 224-n may similarly generate CTB distortion corresponding to CTB terms in a time dependent series representing CTB distortion.

The intermodulation distortion products corresponding to the different distortion terms in the time dependent series may then be combined at the combiner 232 to produce predistortion that more closely approximates the distortion profile. The predistortion may then be combined with the RF signal at the combiner 214 to produce the predistorted RF signal. Because the predistortion generated by the multiple sub-paths 222-0, 222-1, . . . 222-n in the predistortion circuit 200 more closely approximates the distortion profile, the predistorted RF signal will better compensate for the distortion.

Because the intermodulation distortion products generated on one or more of the sub-paths 222-0, 222-1, . . . 222-n may be 180° out of phase with respect to other of the sub-paths 222-0, 222-1, . . . 222-n, the phase of the intermodulation distortion products on one or more of the sub-paths 222-0, 222-1, . . . 222-n may need to be phase inverted. For example, the intermodulation distortion products corresponding to the first order term in the time dependent series are generally 180° out of phase relative to the intermodulation distortion products corresponding to the zero order term in the time dependent series. A respective one of the distortion generators 224-0, 224-1, . . . 224-n or the combiner 232 may provide the desired phase inversion such that the intermodulation distortion products on each of the sub-paths 222-0, 222-1, . . . 222-n are in phase when combined at the combiner 232.

Figure 3:
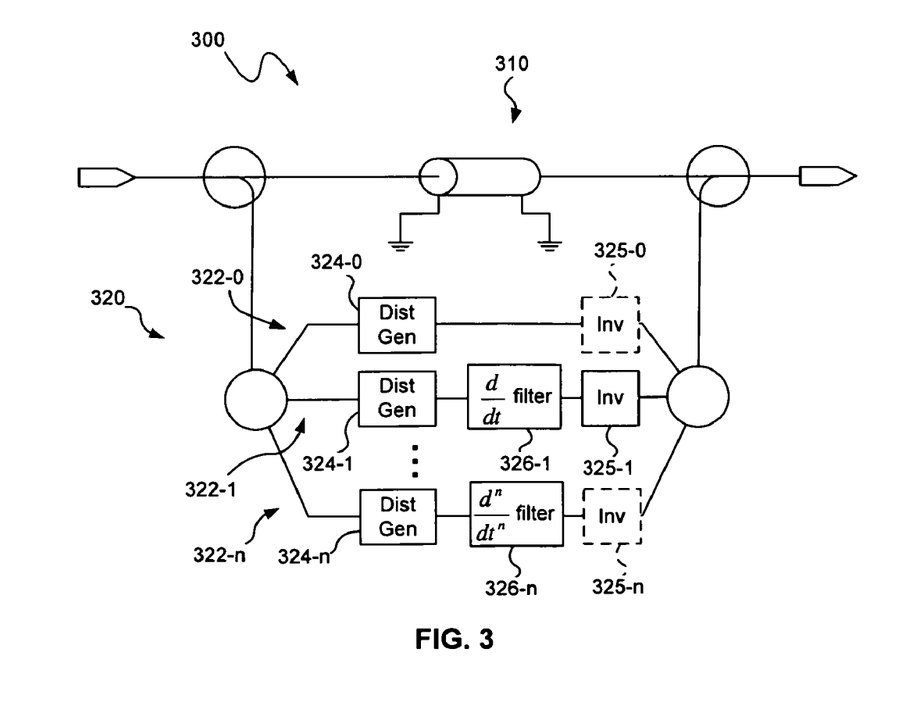
FIG. 3 is a schematic diagram of a distortion compensation circuit including invertible paths based on orders of time dependent series of a distortion signal, consistent with another embodiment of the invention.

A more specific embodiment of a predistortion circuit 300 based on orders of a time dependent series of a power distortion signal is shown in FIG. 3. The predistortion circuit 300 includes a primary signal path 310 coupled to a secondary signal path 320 with parallel distortion sub-paths 322-0, 322-1, . . . 322-n similar to the predistortion circuit 200 described above. According to this embodiment, the parallel distortion sub-paths 322-0, 322-1, . . . 322-n each include a distortion generator 324-0, 324-1, . . . 324-n that generates the intermodulation distortion products of the desired distortion order. Each of the distortion generators 324-0, 324-1, . . . 324-n may be essentially the same, and the intermodulation distortion products generated by the distortion generators 324-0, 324-1, . . . 324-n are generally frequency independent.

Figure 8:
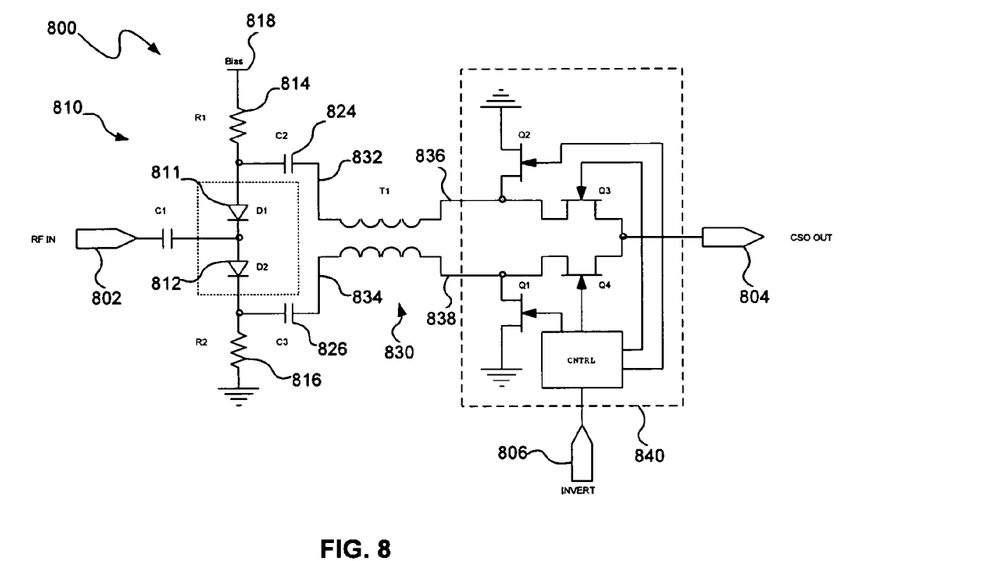
FIG. 8 is a schematic diagram of an invertible CSO distortion generator for use in a predistortion circuit, consistent with one embodiment of the invention.
Figure 9:
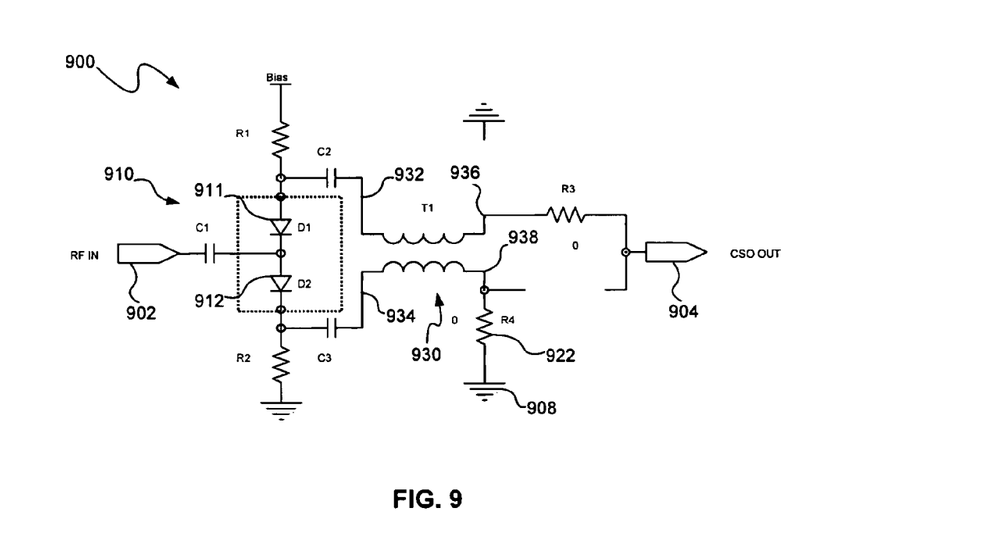
FIG. 9 is a schematic diagram of a CSO distortion generator for use in a predistortion circuit, consistent with another embodiment of the invention.

According to the illustrated embodiment, the predistortion circuit 300 compensates for CSO distortion and the distortion generators 324-0, 324-1, . . . 324-n are CSO distortion generators. The CSO generators 324-0, 324-1, . . . 324-n may include, for example, a square law device that generates second order intermodulation distortion products. A CSO distortion generator (or second order distortion generator) does not necessarily generate only second order distortion. A CSO distortion generator (or second order distortion generator) may include a distortion generator that produces even-order distortion with predominantly second order distortion. Embodiments of CSO distortion generators are shown in FIGS. 8 and 9 and are described in greater detail below. In a predistortion circuit that compensates for odd orders of distortion, other distortion generators may be used, in addition to or instead of the CSO distortion generators, such as CTB distortion generators to compensate for CTB distortion. A CTB distortion generator may include a distortion generator that produces odd-order distortion with predominantly third order distortion.

To produce the distortion products for the respective frequency dependent orders of the time dependent series, the frequency dependent sub-paths 322-1, 322-n also include differentiating filters 326-1, 326-n that filter the frequency independent distortion products to produce an approximate time derivative of the distortion products corresponding to the desired order of the time dependent series. If the distortion generators 324-0, 324-1, . . . 324-n are CSO distortion generators that generate second order distortion products represented by the term $C_{02}I_1^2 e^{j2\omega t}$, for example, the d/dt differentiating filter 326-1 differentiates the second order distortion products to produce an approximate first time derivative of the second order distortion products corresponding to the first order term $C_{12}I_1^2 e^{j2\omega t}i\omega$.

One or more of the distortion sub-paths 322-0, 322-1, . . . 322-n may also include a signal controlled phase inverter 325-0, 325-1, . . . 325-n to invert the phase of the distortion products in one or more of the distortion sub-paths 322-0, 322-1, . . . 322-n. The signal controlled phase inverter(s) 325-0, 325-1, . . . 325-n may be responsive to a phase inversion control signal (e.g., provided by controller 160 shown in FIG. 1) to select a phase of either 0° or 180°. Because the d/dt differentiating filter 326-1 results in a phase shift of 180° in the frequency dependent distortion sub-path 322-1 relative to the frequency independent distortion sub-path 322-0, for example, one or both of the phase inverters 325-0, 325-1 may be used to invert the phase of the distortion products in one or both of the distortion sub-paths 322-0, 322-1 such that the frequency independent distortion products and the frequency dependent distortion products are substantially in phase. Predistortion circuits including signal controlled phase invertible paths are described in greater detail in U.S. patent application Ser. No. 12/026,182, filed concurrently herewith and fully incorporated herein by reference.

The signal controlled phase inverters 325-0, 325-1, . . . 325-n may also be located in other locations along the sub-paths 322-0, 322-1, . . . 322-n other than directly following the distortion generators 324-0, 324-1, . . . 324-n. The primary signal path 310 may also include a signal controlled phase inverter (not shown) to provide controllable phase inversion of the RF signal in the primary signal path 310.

Figure 4:
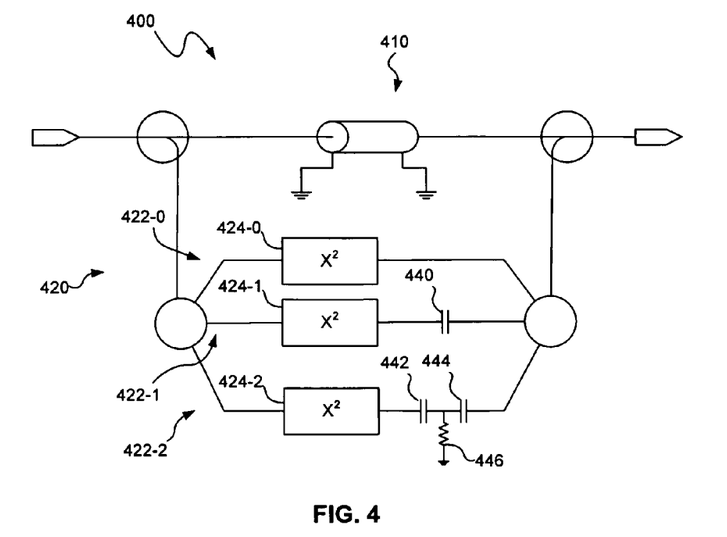
FIG. 4 is a schematic diagram of a distortion compensation circuit including multiple paths based on orders of time dependent series of a distortion signal, consistent with another embodiment of the present invention.

A further embodiment of a predistortion circuit 400 is shown in FIG. 4. The predistortion circuit 400 includes a primary signal path 410 coupled to a secondary signal path 420 similar to the predistortion circuit 200 described above. According to this embodiment, three parallel distortion sub-paths 422-0, 422-1, 422-2 include second order distortion generators 424-0, 424-1, 424-2 that generate frequency independent second order distortion products. The zero order frequency independent sub-path 422-0 may be unfiltered to pass the frequency independent second order distortion products. The first order sub-path 422-1 and the second order sub-path 422-2 may be filtered to produce the frequency dependent distortion products from the frequency independent distortion products generated by the distortion generators 424-1, 424-2.

The first order frequency dependent sub-path 422-1 includes a capacitor 440 following the second order distortion generator 424-1 to provide the first time derivative (d/dt) filtering of the second order distortion products. The capacitor 440 may have a capacitance capable of providing the desired d/dt function without blocking too much magnitude of the distortion. For example, the capacitor 440 may have a capacitance between 0.5 pF and 5 pF, and more specifically about 2 pF for a secondary path with 50 ohms impedance. This value gives a reasonable approximation of a d/dt filter over a reasonably wide bandwidth. The second order frequency dependent sub-path 422-1 includes capacitors 442, 444 and resistor 446 to provide the second time derivative ($d^2/dt^2$) filtering of the second order distortion products. The capacitors 442, 444 may have a capacitance between about 0.5 pF and 5 pF and the resistor 446 may have a resistance of about 75 ohm. Other types of components may also be used to provide the desired differentiation, such as an inductor.

Figure 5:
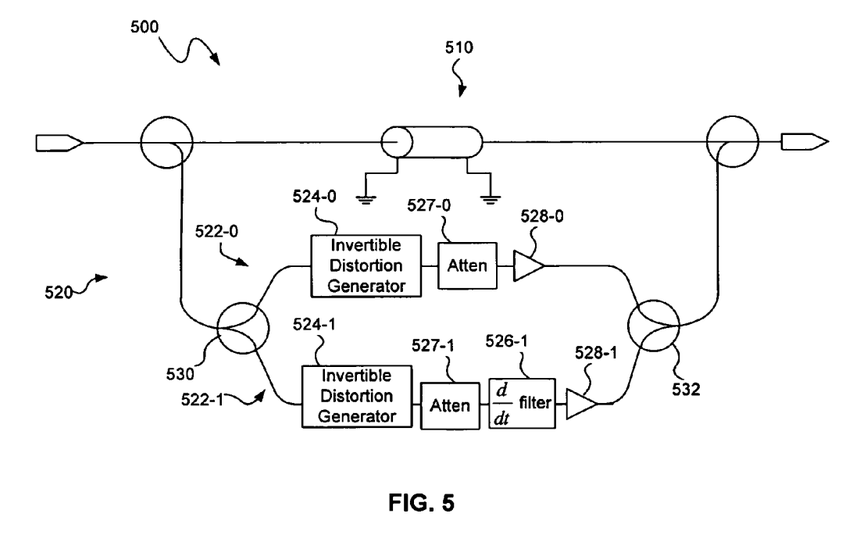
FIG. 5 is a schematic diagram of a distortion compensation circuit including a frequency independent path and a frequency dependent path, consistent with a further embodiment of the invention.

FIG. 5 shows another embodiment of a predistortion circuit 500 that provides predistortion based on orders of time dependent series of a power distortion signal. The predistortion circuit 500 may include a primary signal path 510 and a secondary signal path 520 including a frequency independent distortion sub-path 522-0 and a frequency dependent distortion sub-path 522-1. The sub-paths 522-0, 522-1 may be coupled at each end by a splitter 530, such as a 3 dB splitter, and a combiner 532, such as a 3 dB combiner. According to this embodiment, the frequency independent distortion sub-path 522-0 produces the frequency independent distortion products corresponding to the zero order term in the time dependent series and the frequency dependent distortion sub-path 522-1 produces frequency dependent distortion products corresponding to the first order term in the time dependent series.

Each of the sub-paths 522-0, 522-1 may include invertible distortion generators 524-0, 524-1 that generate distortion products, which may be phase inverted in response to a phase inversion control signal. One embodiment of an invertible CSO distortion generator is shown in FIG. 8 and described in greater detail below. In the frequency dependent sub-path 522-1, a d/dt differentiating filter 526-1 following the invertible distortion generator 524-1 filters the distortion products to produce the frequency dependent distortion products corresponding to the first order term.

One or both of the distortion sub-paths 522-0, 522-1 of the secondary signal path 520 may also include one or more gain control elements, such as a variable attenuator 527-0, 527-1 and/or an amplifier 528-0, 528-1, before and/or after the distortion generators 524-0, 524-1 to control a magnitude of the predistortion generated by the distortion generators 524-0, 524-1. Variable gain control elements help to ensure that the magnitude of the predistortion corresponds sufficiently to the magnitude of the distortion being compensated. The variable attenuators 527-0, 527-1 may be PIN attenuators and may receive attenuation control signals from a controller (e.g., controller 160 shown in FIG. 1) to adjust the attenuation as needed. One or both of the distortion sub-paths 522-0, 522-1 of the secondary signal path 520 may also include delay components (not shown) to add small amounts of delay in each sub-path 522-0, 522-1 to "zero" out any path length differences. Other embodiments of predistortion circuits including invertible distortion generators are described in greater detail U.S. patent application Ser. No. 12/026,182, which is filed concurrently herewith and is fully incorporated herein by reference.

Figure 6:
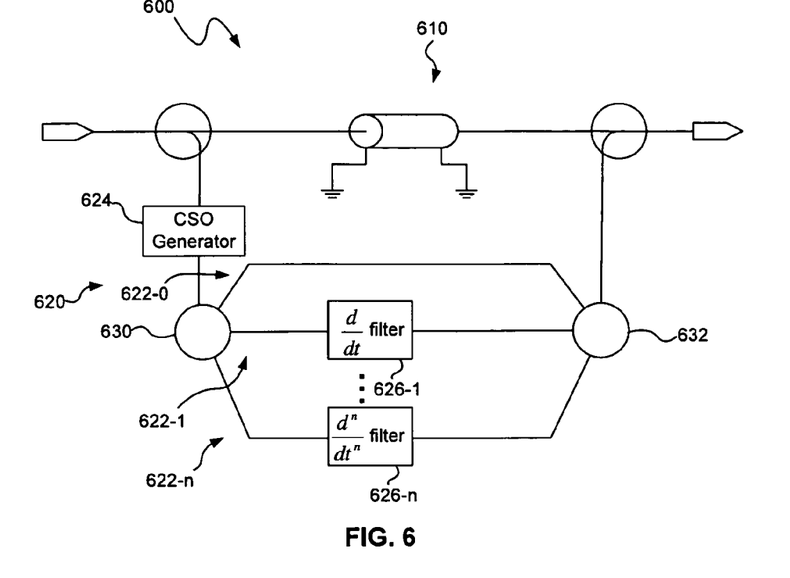
FIG. 6 is a schematic diagram of a distortion compensation circuit including multiple paths based on orders of time dependent series of a distortion signal, consistent with yet another embodiment of the invention.

FIG. 6 shows yet another embodiment of a predistortion circuit 600. The predistortion circuit 600 includes a primary signal path 610 coupled to a secondary signal path 620 similar to the predistortion circuit 200 described above. According to this embodiment, the secondary signal path 620 includes a single distortion generator 624 located before the splitter 630 to generate the intermodulation distortion products. The parallel distortion sub-paths 622-0, 622-1, ... 622-n then provide the filtering needed to produce the distortion products based on the respective frequency dependent orders of the time dependent series. The frequency dependent sub-paths 622-1, ... 622-n, for example, include the differentiating filters 626-1, ... 626-n to produce the distortion products for the $1^{st}$ to $n^{th}$ order terms. The frequency independent path 622-0 remains unfiltered to produce the distortion products for the 0 order term.

Figure 7:
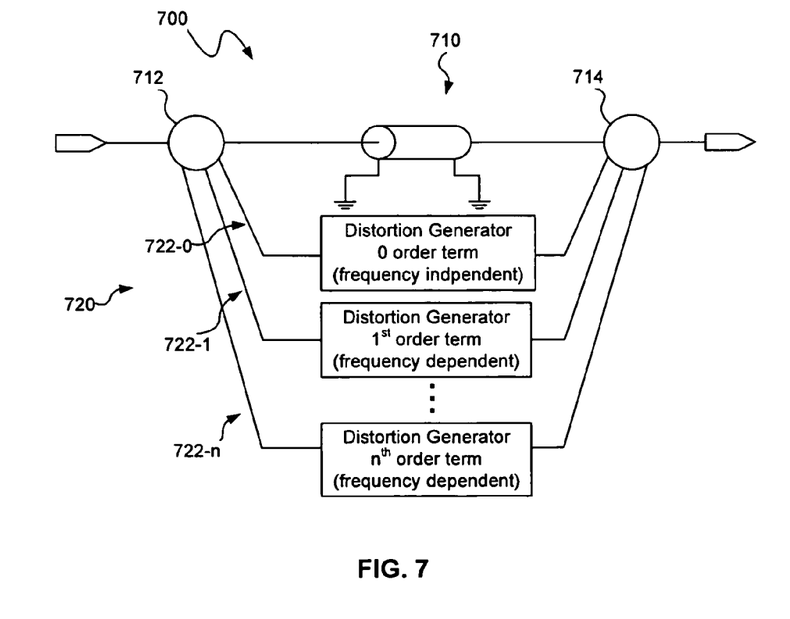
FIG. 7 is a schematic diagram of a distortion compensation circuit including multiple paths based on orders of time dependent series of a distortion signal, consistent with a further embodiment of the invention.

FIG. 7 shows yet another embodiment of a predistortion circuit 700 including a primary signal path 710 and a secondary signal path 720. According to this embodiment, the secondary signal path 720 includes a plurality of parallel distortion sub-paths 722-0, 722-1, ... 722-n coupled directly to the primary signal path 710 via splitter 712 and combiner 714.

Figure 7A:
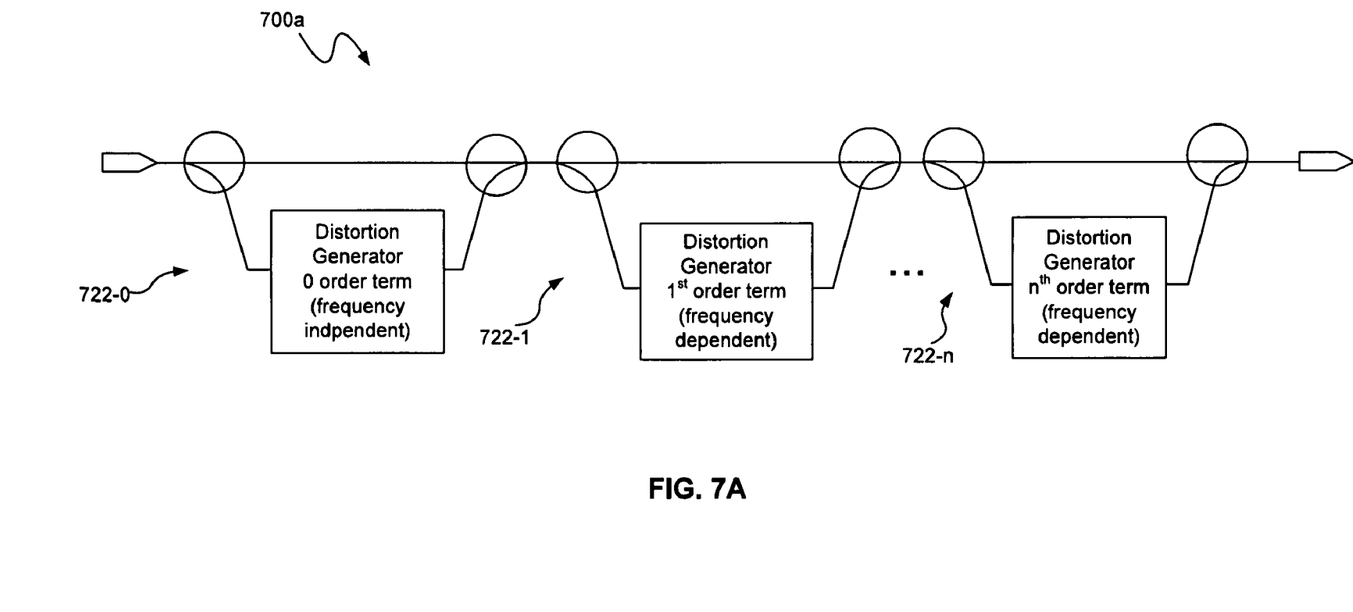
FIG. 7A is a schematic diagram of a distortion compensation circuit including multiple paths in series based on orders of time dependent series of a distortion signal, consistent with a further embodiment of the invention.

FIG. 7A shows yet another embodiment of a distortion compensation circuit 700a. According to this embodiment, the secondary distortion sub-paths 722-0, 722-1, ... 722-n are arranged in series instead of in parallel. Various other configurations of distortion compensation circuits are also possible based on orders of time dependent series of a distortion signal.

One embodiment of an invertible CSO generator 800 is shown in greater detail in FIG. 8. The invertible CSO generator 800 may be used in distortion compensation circuits described herein (e.g., the predistortion circuit 500 shown in FIG. 5). The invertible CSO generator 800 receives the RF input signal at an input 802, generates second order intermodulation products from the RF input signal, and provides the second order intermodulation products (i.e., the CSO distortion) at an output 804.

The invertible CSO generator 800 may include a CSO distortion generator portion 810 including diodes 811, 812 connected and arranged to generate the CSO distortion. One example of the diodes 811, 812 is a matched series pair of Schottky diodes. The diodes 811, 812 are connected and arranged relative to the RF input such that RF voltage drop across the diodes 811, 812 are opposite relative to the polarity of the diode. The RF currents through the diodes are then added by use of a balun 830 or other similar devices which block common mode or odd-order signals, but adds differential or even-order signals. Thus, odd order components of the current from the diodes 811, 812 are effectively blocked, but even order components are passed. Although the exemplary embodiment shows one arrangement of a series pair of diodes, other arrangements and numbers of diodes are possible such that the diodes are capable of producing distortion corresponding to the distortion to be compensated.

The CSO generator portion may also include bias resistors 814, 816 coupled in series with the diodes 811, 812. A DC bias voltage coupled to the network of diodes 811, 812 and bias resistors 814, 816 results in a bias current ($I_b$) across the diodes 811, 812. In general, the diodes 811, 812 are biased to operate in the forward bias region when generating distortion. The bias resistors are chosen along with bias current to provide, among other things, good input impedance match. The diode bias may be set manually by an on-board variable resistor (not shown). In other embodiments, an adjustable bias control may adjust the bias current ($I_b$) provided to the diodes 811, 812 to control, among other things, compensating distortion magnitude, for example, as described in greater detail in U.S. patent application Ser. No. 11/834,873, which is fully incorporated herein by reference. Although the exemplary embodiment shows one configuration and arrangement of the bias resistors together with the diodes, other configurations and bias resistor networks are possible to provide a desired bias current across the diodes. The CSO generator portion 810 may also include DC blocking capacitors 824, 826 coupled to the diodes 811, 812, respectively, to isolate the DC bias signals from RF signals.

The output of the balun 830 may be connected to an RF switching device 840 to provide phase inversion capabilities. The phase inversion state of the even-order distortion passing through the balun 830 to the output 804 depends on which of the output terminals 836, 838 is coupled to the output 804 and which of the output terminals 836, 838 is coupled to ground 808a, 808b.

The switching device 840 is coupled to the output terminals 836, 838 of the balun 830 and selects which side of the balun 830 to tap off of in response to a phase inversion control signal received at control signal input 806. For example, when the switching device 840 invert control signal input 806 is low, the balun terminal 836 may be coupled to output 804 and the balun terminal 838 may be coupled to ground 808b providing a phase of 0°. When the switching device 840 invert control signal input 808 is high, the switching device 840 causes the balun terminal 836 to be coupled to ground 808a and causes the balun terminal 838 to be coupled to output 804 providing in a phase change of 180°. In other words, the switching device 840 causes the balun 830 to invert the distortion provided to the output 804 in response to an inversion control signal.

The switching device 840 may be a solid state RF switch as shown. The switching device 840 may also be implemented using other discrete devices, such as a RF relay or a RF MEMS (microelectromechanical system) switch. The control signal input 806 of the switching device 840 may be coupled to a controller (e.g., controller 160 shown in FIG. 1), which provides the phase inversion control signal as a digital output signal based on various parameters, as described in greater detail below. The controller may include firmware configured to generate the phase inversion control signal in response to various parameters affecting distortion in a system, such as temperature, bias current, and fiber length, as described in greater detail below. Thus, the controller or microprocessor may control distortion compensation in response to the various parameters.

FIG. 9 shows another embodiment of a distortion generator 900, which is not invertible. Similar to the invertible distortion generator 800 described above, the distortion generator 900 includes a RF input 902, a distortion output 904, and a distortion generator portion 910 coupled to a balun 930. The distortion generator portion 910 includes a pair of diodes 911, 912 configured to generate second order intermodulation distortion products, as described above, although other configurations may be used to provide second order distortion products or higher order distortion products. The balun 930 includes input terminals 932, 934 coupled to the respective diodes 911, 912 to combine the output from the diodes 911, 912 to a single distortion output. In this embodiment, the balun 930 includes an output terminal 936 coupled to the distortion output 904 and an output terminal 938 coupled to ground 908 via resistor 922. Although two different exemplary distortion generators 800, 900 are shown, other types of distortion generators may also be used in the embodiments of the distortion compensation circuit described herein.

Accordingly, distortion compensation circuits based on orders of time dependent series of a distortion signal may improve distortion compensation by producing predistortion and/or postdistortion that more closely approximates the distortion profile of the distortion being compensated. In particular, the distortion compensation circuits described herein provide improved compensation of the frequency dependent components of the distortion.

Consistent with one embodiment, a distortion compensation circuit is provided for compensating for distortion of a distortion order produced by at least one non-linear element. The distortion compensation circuit includes a primary signal path configured to receive at least a portion of an input signal and a secondary signal path coupled to the primary signal path. The secondary signal path is configured to receive at least a portion of the input signal and to generate distortion of the distortion order from the input signal. The secondary signal path includes a plurality of distortion sub-paths with each of the distortion sub-paths configured to produce intermodulation distortion products of the distortion order but for different frequency dependent orders of a time dependent series representative of the distortion produced by the non-linear element.

Consistent with another embodiment, an optical transmitter includes a RF signal input configured to provide a RF input signal and a predistortion circuit configured to receive the RF input signal and to generate a predistorted RF input signal. The predistortion circuit includes a primary signal path configured to receive at least a portion of the RF input signal and a secondary signal path coupled to the primary signal path and configured to receive at least a portion of the RF input signal and to generate distortion from the RF input signal. The secondary signal path including a plurality of parallel distortion sub-paths with each of the distortion sub-paths configured to produce intermodulation distortion products of the same distortion order but for different frequency dependent orders of a time dependent series representative of the distortion produced by the non-linear amplifier. The optical transmitter also includes a laser configured to receive the predistorted RF input signal and to generate a modulated optical output, wherein the predistorted RF input signal compensates for distortion generated by at least the laser.

Consistent with a further embodiment, a method is provided for compensating for distortion of a distortion order produced by at least one non-linear element. The method includes: providing a distortion compensation circuit including a primary signal path configured to receive at least a portion of an input signal and a secondary signal path coupled to the primary signal path and configured to receive at least a portion of the input signal, the secondary signal path comprising at least one distortion generator configured to generate intermodulation distortion products of a distortion order from the input signal; and receiving a portion of an RF signal on the primary signal path; receiving a portion of the RF signal on the secondary signal path; generating frequency independent intermodulation distortion products of the distortion order from the RF signal on a first distortion sub-path of the secondary signal path; generating frequency dependent intermodulation distortion products of the distortion order from the RF signal on at least a second distortion sub-path of the secondary signal path; combining the frequency independent intermodulation distortion products and the frequency dependent intermodulation distortion products on the secondary signal path to produce compensating distortion of the distortion order; and combining the compensating distortion with the RF signal.

While the principles of the invention have been described herein, it is to be understood by those skilled in the art that this description is made only by way of example and not as a limitation as to the scope of the invention. Other embodiments are contemplated within the scope of the present invention in addition to the exemplary embodiments shown and described herein. Modifications and substitutions by one of ordinary skill in the art are considered to be within the scope of the present invention, which is not to be limited except by the following claims.

What is claimed is:

1. A distortion compensation circuit for compensating for distortion of a distortion order produced by at least one non-linear element, the distortion compensation circuit comprising:
    a primary signal path configured to receive at least a portion of an input signal; and
    a secondary signal path coupled to the primary signal path, the secondary signal path configured to receive at least a portion of the input signal and to generate distortion of the distortion order from the input signal, the secondary signal path including a plurality of distortion sub-paths with each of the distortion sub-paths configured to produce intermodulation distortion products of the distortion order based on a respective frequency dependent order of a time dependent series representative of the distortion produced by the non-linear element.

2. The distortion compensation circuit of claim 1 wherein at least a first one of the distortion sub-paths is configured to generate frequency independent intermodulation distortion products corresponding to a zero order term in the time dependent series representative of the distortion produced by the non-linear element, and wherein at least a second one of the distortion sub-paths is configured to generate frequency dependent intermodulation distortion products corresponding to a first order term in the time dependent series representative of the distortion produced by the non-linear element.

3. The distortion compensation circuit of claim 2 wherein the second one of the distortion sub-paths includes a phase inverter configured to invert a phase of the frequency dependent intermodulation distortion products corresponding to the first order term.

4. The distortion compensation circuit of claim 2 wherein the second one of the distortion sub-paths includes an invertible distortion generator configured to generate intermodulation distortion products and to invert a phase of the intermodulation distortion products.

5. The distortion compensation circuit of claim 1 wherein the distortion sub-paths both produce second order intermodulation distortion products.

6. The distortion compensation circuit of claim 5 wherein the distortion sub-paths each include second order distortion generators configured to generate the second order distortion products.

7. The distortion compensation circuit of claim 6 wherein at least one of the distortion sub-paths includes a d/dt differentiating filter following the second order distortion generator to produce second order intermodulation distortion products corresponding to a first order term in the time dependent series representative of the distortion produced by the non-linear element.

8. The distortion compensation circuit of claim 7 wherein the d/dt differentiating filter includes a capacitor.

9. The distortion compensation circuit of claim 8 wherein the capacitor has a capacitance in a range of 0.5 pF to 5 pF.

10. The distortion compensation circuit of claim 7 wherein at least one of the distortion sub-paths includes a $d^2/dt^2$ differentiating filter following the second order distortion generator to produce second-order intermodulation distortion products corresponding to a second order term in the time dependent series representative of the distortion produced by the non-linear element.

11. The distortion compensation circuit of claim 1 wherein the secondary signal path includes at least one gain control element configured to adjust the magnitude of the predistortion.

12. The distortion compensation circuit of claim 1 wherein the secondary signal path includes at least one variable attenuator and at least one amplifier.

13. The distortion compensation circuit of claim 6 wherein at least one of the second order distortion generators includes a series pair of diodes.

14. The distortion compensation circuit of claim 1 further comprising:
    a splitter coupling the primary signal path to the secondary signal path and configured to split the input signal into the portions received on the primary signal path and the secondary signal path; and
    a combiner coupling the primary signal path to the secondary signal path and configured to cause the predistortion on the secondary signal path to be combined with the input signal on the primary signal path.

15. The distortion compensation circuit of claim 1 wherein the distortion sub-paths are coupled in parallel, and wherein the secondary signal path further comprises:
    a splitter coupled to the distortion sub-paths and configured to split the input signal on the secondary path into portions of the input signal received on the distortion sub-paths; and
    a combiner coupled to the distortion sub-paths and configured to combine distortion products on the parallel distortion sub-paths.

16. The distortion compensation circuit of claim 15 wherein the combiner provides a 180° phase shift of the distortion products on at least one of the parallel distortion sub-paths relative to the distortion products on at least one other of the parallel distortion sub-paths.

17. The distortion compensation circuit of claim 15 wherein the secondary signal path includes a second order distortion generator located before the splitter and configured to generate second order intermodulation distortion products, and wherein at least one of the parallel distortion sub-paths includes a d/dt differentiating filter configured to filter the second order intermodulation products to produce second-order intermodulation distortion products corresponding to a first order term in the time dependent series representative of the distortion produced by the non-linear element.

18. The distortion compensation circuit of claim 17 wherein at least one of the parallel distortion sub-paths includes a $d^2/dt^2$ differentiating filter configured to differentiate the second order intermodulation products to produce second-order intermodulation distortion products corresponding to a second order term in the time dependent series representative of the distortion produced by the non-linear element.

19. An optical transmitter comprising:
    a RF signal input configured to provide a RF input signal;
    a predistortion circuit configured to receive the RF input signal and to generate a predistorted RF input signal, the predistortion circuit comprising:

a primary signal path configured to receive at least a portion of the RF input signal; and a secondary signal path coupled to the primary signal path and configured to receive at least a portion of the RF input signal and to generate distortion from the RF input signal, the secondary signal path including a plurality of distortion sub-paths with each of the distortion sub-paths configured to produce intermodulation distortion products of the same distortion order based on a respective frequency dependent order of a time dependent series representative of the distortion produced by a non-linear element;

a laser configured to receive the predistorted RF input signal and to generate a modulated optical output, wherein the predistorted RF input signal compensates for distortion generated by at least the laser.

20. The optical transmitter of claim 19 wherein at least one of the distortion sub-paths includes a signal controlled phase inverter configured to invert the phase of the distortion products on the at least one of the distortion sub-paths in response to a phase inversion control signal.

21. The optical transmitter of claim 20 further comprising a controller coupled to the predistortion circuit and configured to generate the phase inversion control signal.

22. The optical transmitter of claim 19 wherein each of the distortion sub-paths includes a distortion generator configured to generate intermodulation distortion products of the same distortion order, wherein at least one of the distortion sub-paths passes the intermodulation distortion products unfiltered to produce intermodulation distortion products corresponding to a zero order term in the time dependent series representative of the distortion produced by the non-linear element, and wherein other ones of the distortion sub-paths filter the intermodulation distortion products to produce time derivatives of the intermodulation distortion products corresponding to higher order terms in the time dependent series representative of the distortion produced by the non-linear element.

23. A method of compensating for distortion of a distortion order produced by at least one non-linear element, the method comprising:

providing a distortion compensation circuit including a primary signal path configured to receive at least a portion of an input signal and a secondary signal path coupled to the primary signal path and configured to receive at least a portion of the input signal, the secondary signal path comprising at least one distortion generator configured to generate intermodulation distortion products of a distortion order from the RF signal; and receiving a portion of an RF signal on the primary signal path;

receiving a portion of the RF signal on the secondary signal path;

generating frequency independent intermodulation distortion products of the distortion order from the RF signal on a first distortion sub-path of the secondary signal path;

generating frequency dependent intermodulation distortion products of the distortion order from the RF signal on at least a second distortion sub-path of the secondary signal path;

combining the frequency independent intermodulation distortion products and the frequency dependent intermodulation distortion products on the secondary signal path to produce compensating distortion of the distortion order; and combining the compensating distortion with the RF signal.

24. The method of claim 23 wherein generating frequency dependent intermodulation distortion products includes generating frequency independent intermodulation distortion products of the distortion order and d/dt filtering the frequency independent intermodulation distortion products to produce a first time derivative of the frequency independent intermodulation distortion products.

25. The method of claim 23 wherein generating frequency independent intermodulation distortion products from the RF signal and generating frequency dependent intermodulation distortion products from the RF signal both include generating second order intermodulation distortion products, wherein the second order intermodulation products on the second distortion sub-path are d/dt filtered to produce a first time derivative of the frequency independent intermodulation distortion products.

* * * * *